US008400570B2

(12) United States Patent
Dunn et al.

(10) Patent No.: US 8,400,570 B2
(45) Date of Patent: Mar. 19, 2013

(54) SYSTEM AND METHOD FOR DISPLAYING MULTIPLE IMAGES/VIDEOS ON A SINGLE DISPLAY

(75) Inventors: William R. Dunn, Alpharetta, GA (US); Gerald Fraschilla, Snellville, GA (US); Rick De Laet, Alpharetta, GA (US)

(73) Assignee: Manufacturing Resources International, Inc., Alpharetta, GA (US)

( * ) Notice: Subject to any disclaimer, the term of this patent is extended or adjusted under 35 U.S.C. 154(b) by 564 days.

(21) Appl. No.: 12/711,407

(22) Filed: Feb. 24, 2010

(65) Prior Publication Data

US 2010/0238352 A1    Sep. 23, 2010

Related U.S. Application Data

(63) Continuation-in-part of application No. 12/248,255, filed on Oct. 9, 2008, now Pat. No. 8,128,342.

(60) Provisional application No. 61/155,100, filed on Feb. 24, 2009.

(51) Int. Cl.
*H04N 5/66* (2006.01)
*H04N 9/12* (2006.01)
*H04N 7/12* (2006.01)

(52) U.S. Cl. .......... 348/739; 348/42; 348/385.1

(58) Field of Classification Search ............ 348/42, 348/43, 54–59, 46–48, 739, 588, 598, 385.1, 348/387.1, 388.1; 345/5, 6; 375/240.26; 381/85, 300, 56, 334, 123; 434/314, 365, 434/428, 430; 359/462, 463

See application file for complete search history.

(56) References Cited

U.S. PATENT DOCUMENTS

| | | | | |
|---|---|---|---|---|
| 4,399,456 | A * | 8/1983 | Zalm | 348/43 |
| 4,571,616 | A * | 2/1986 | Haisma et al. | 348/59 |
| 5,049,987 | A * | 9/1991 | Hoppenstein | 348/48 |
| 6,055,012 | A * | 4/2000 | Haskell et al. | 348/48 |
| 6,075,556 | A * | 6/2000 | Urano et al. | 348/43 |
| 6,674,463 | B1 * | 1/2004 | Just et al. | 348/43 |
| 6,697,100 | B2 * | 2/2004 | Tatsuzawa | 348/48 |
| 7,136,415 | B2 * | 11/2006 | Yun et al. | 375/240.26 |
| 7,391,811 | B2 * | 6/2008 | Itoi et al. | 375/240.26 |
| 7,825,991 | B2 * | 11/2010 | Enomoto | 348/588 |
| 8,130,836 | B2 * | 3/2012 | Ha | 375/240.16 |
| 8,242,974 | B2 * | 8/2012 | Yamazaki et al. | 345/6 |
| 2002/0163513 | A1 | 11/2002 | Tsuji | |
| 2003/0117428 | A1 | 6/2003 | Li et al. | |
| 2004/0252187 | A1 * | 12/2004 | Alden | 348/51 |
| 2005/0046951 | A1 * | 3/2005 | Sugihara et al. | 359/619 |
| 2008/0170028 | A1 | 7/2008 | Yoshida | |
| 2010/0194861 | A1 * | 8/2010 | Hoppenstein | 348/48 |
| 2011/0181693 | A1 * | 7/2011 | Lee et al. | 348/43 |

* cited by examiner

*Primary Examiner* — Victor Kostak

(74) *Attorney, Agent, or Firm* — Standley Law Group LLP

(57) ABSTRACT

A system and method for displaying multiple images on a single display. A plurality of unique video sources may be provided where each video source provides video frames having a plurality of vertical lines. A portion of the vertical lines are captured for each video source and transmitted to the display. The partial video frames may then be re-assembled into a single video frame which can be shown on the display. The display contains a masking where only certain vertical lines are viewable at certain angles. The masking may allow two or three images to be simultaneously visible to the observer, depending on the angle of viewing the display. Wireless or wired transmission may be used. Some embodiments also use a sound focusing device which may be synced with the video source so that separate sound messages can also be observed depending on the angle of viewing the display.

21 Claims, 3 Drawing Sheets

SYSTEM AND METHOD FOR DISPLAYING MULTIPLE IMAGES/VIDEOS ON A SINGLE DISPLAY

CROSS-REFERENCE TO RELATED APPLICATIONS

This application is a non-provisional of U.S. application No. 61/155,100 filed on Feb. 24, 2009 incorporated by reference in its entirety. This application is a continuation-in-part of co-pending U.S. application Ser. No. 12/248,255 filed on Oct. 9, 2008, incorporated by reference in its entirety.

TECHNICAL FIELD

This invention generally relates to electronic displays and systems which accept three independent video/image sources and display them on a single display.

BACKGROUND OF THE ART

Traditionally, advanced electronic display systems have only been used for indoor entertainment applications. However, modern electronic displays are also being used for advertising and informational purposes. When used for advertising, catching the attention of the consumer can sometimes be a difficult task. Further, advertising space is limited, and there is a strong desire to include as much advertising information as possible within a given physical space.

SUMMARY OF THE EXEMPLARY EMBODIMENTS

Exemplary embodiments include a system and method for accepting three independent video/image sources and displaying them on a single display, where the viewing angle relative to the display determines which image or video may be seen by an observer. The three sources may be combined onto a single network cable and sent to one or more displays. The displays contain a special masking which permits only certain pixel rows or columns to be seen from different angles relative to the display. As an observer passes by the display, they will see three separate images. If one of the video sources were to fail, a default image or video may be displayed to prevent any portion of the display from going blank.

The foregoing and other features and advantages of exemplary embodiments will be apparent from the following more detailed description of the particular embodiments, as illustrated in the accompanying drawings.

BRIEF DESCRIPTION OF THE DRAWINGS

A better understanding of an exemplary embodiment will be obtained from a reading of the following detailed description and the accompanying drawings wherein identical reference characters refer to identical parts and in which.

DETAILED DESCRIPTION

Figure 1:
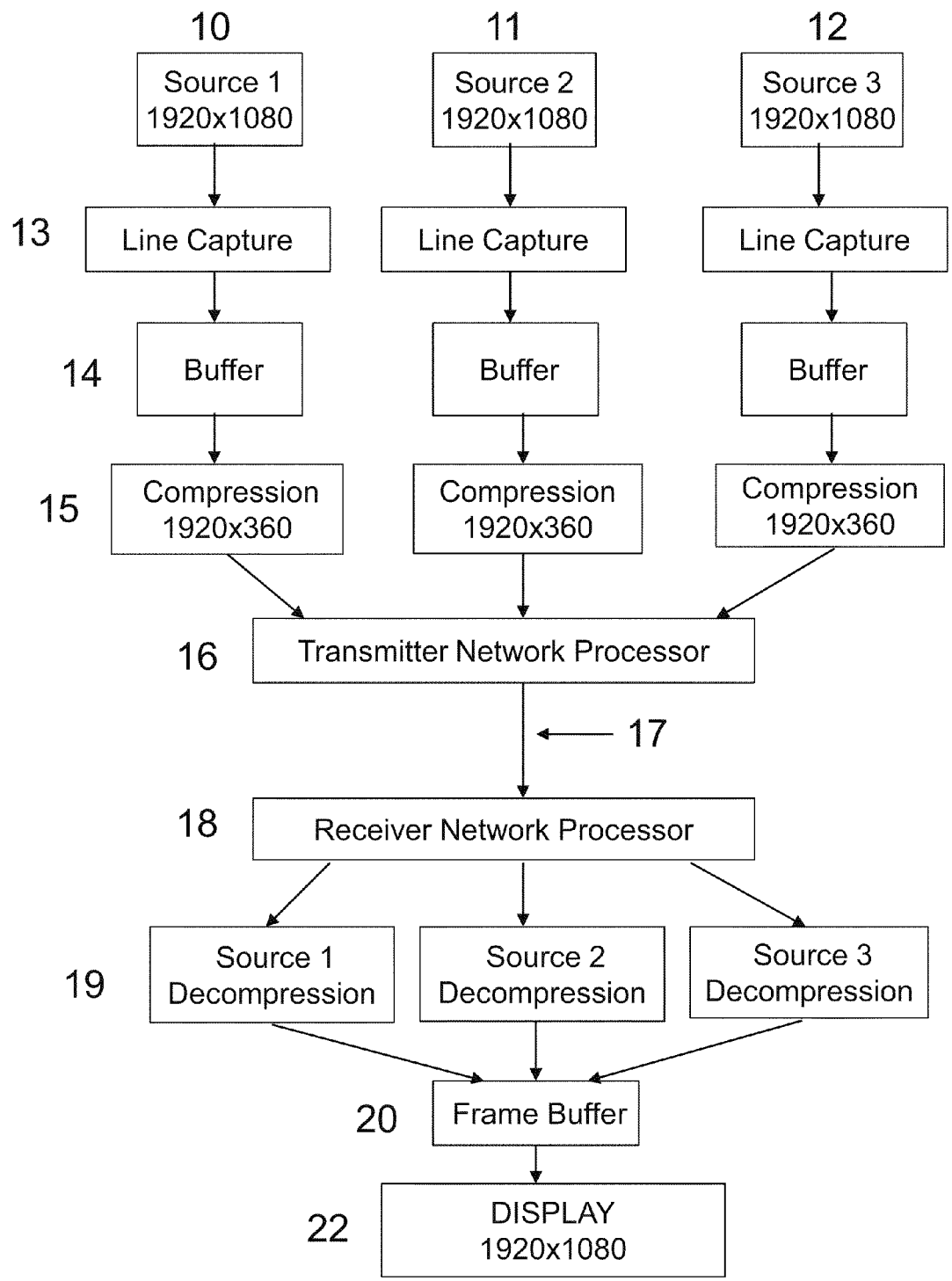
FIG. 1 is a block diagram of components/processes for an exemplary system accepting 1080 video sources.

FIG. 1 provides a block diagram of the components/steps which may be used in an exemplary system. Three independent video sources 10, 11, and 12 supply the video/image data to the system. Each source may contain relatively static images (e.g. still photos or logos) or may contain dynamic video (e.g. movie previews or commercials). Each video source 10, 11, and 12 is independent and may not require synchronization. In this embodiment, each video source is in the 1080 format which is the desired format for the end display 22. However, as discussed below, embodiments can be designed which can accept any resolution video source.

A line capture process 13 may be used where every third vertical line (if using vertical masking on the display) of each video source is captured. Thus, in this embodiment lines 1, 4, 7, 10, . . . for each video source are captured and the remaining lines are discarded. Any type of microprocessor or central processing unit (CPU) could be programmed to perform the line capture process. The captured images may be stored in a buffer 14 and then sent through an image compression device 15. Any form of encoding or compression may be used. However, in an exemplary embodiment JPEG 2000 compression (encoding) chips may be used. Some embodiments may transmit the video data without compression, depending on the variables of the transmission method (wired, wireless, bandwidth, data transfer rates, etc.). This information is then sent to a transmitter network processor 16 which may be used to multiplex the three compressed signals onto a single network cable 17. In an exemplary embodiment, the transmitter network processor 16 may combine the three compressed signals onto a CAT5 or CAT6 network cable. The compressed signals may also be transmitted wirelessly.

A receiver network processor 18 may be used to receive the compressed images from the transmitter network processor 16. The receiver network processor 18 may demux the combination into the original three separate signals and then send each signal to a decompression (decoding) device 19. Again, an exemplary embodiment would use JPEG 2000 decompression (decoding) chips, but these are not required and compression/decompression may not be necessary. Each decompressed signal is then written to its proper location within a frame buffer 20. The following may be used for the proper locations within an exemplary 1080 system embodiment:

Source 1—Lines 1, 4, 7, 10, . . . , 1075, 1078.
Source 2—Lines 2, 5, 8, 11, . . . , 1076, 1079.
Source 3—Lines 3, 6, 9, 12, . . . , 1077, 1080.

This information may then be sent to the display 22 where Source 1 (10) may be visible from a first side angle to the display 22, Source 2 (11) may be visible at the center of the display, and Source 3 (12) may be visible from a second angle to the display. In some embodiments, a single buffer may be used. In other embodiments, a double buffer system may be used prior to sending the information to the display 22. Using two buffers provides for an advantage at least because the frames may be written at a first frame rate and then read at a second frame rate. For example, the frames may be written at 30 fps and then read at 60 fps. Thus, the buffers can act as a frame rate converter going from 30 Hz to 60 Hz, if necessary.

As mentioned above, each of the video sources is independent and does not require synchronization prior to being transmitted. However, the receiver network processor 18 prepares the decompression devices 19 and these devices may be synchronized. Thus, once the decompression devices 19 begin operating at their given frame rate (ex. 30 fps) they must receive data during each frame rate. If a frame is not received in time then the previous frame for that particular video source may be repeated. If a new frame still does not arrive at the decompression device 19, then a standard logo may be displayed for that video source while the other video sources continue to operate in standard fashion.

Figure 2:
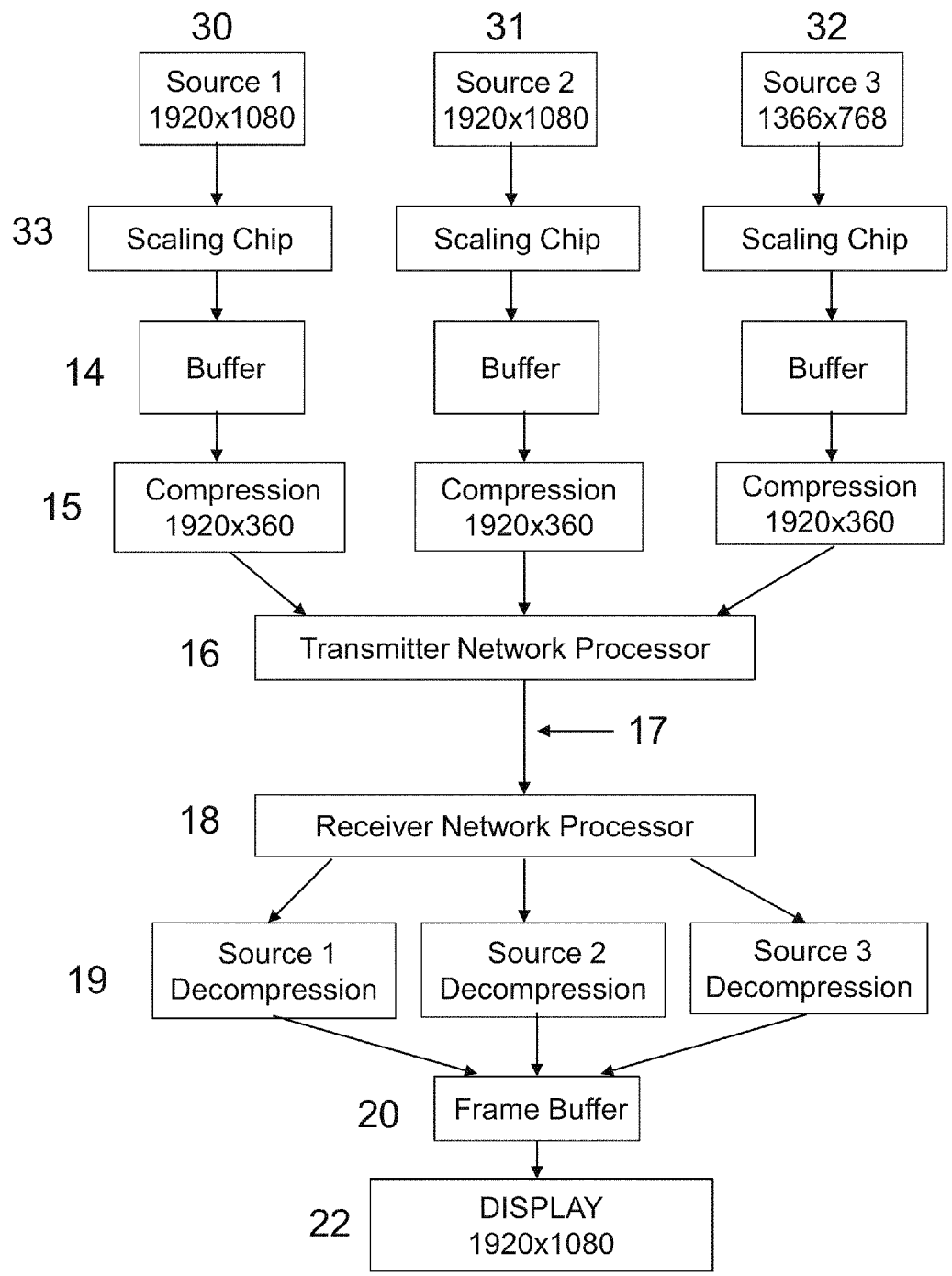
FIG. 2 is a block diagram of components/processes for an exemplary system accepting video sources of varying formats.

FIG. 2 shows a second embodiment where the video sources 30, 31, and 32 are not all in the native resolution of the end display 22. Here, the end display 22 is still 1080 but video source 3 (32) is 1366×768. In this embodiment, scaling chips 33 may be used to modify the incoming resolution of the video source (if needed) and convert the signals into the desired resolution of 1920×360. Even if each of the video sources were in the desired end display resolution, scaling chips may still be used to convert each 1920×1080 incoming signal into the desired 1920×360.

In this embodiment, the scaling chips 33 are used instead of the frame capture method which was shown in the FIG. 1 embodiment. Using scaling chips 33 may be advantageous as it may reduce or substantially eliminate any image artifacts (as compared to the line capture method where the unused lines are discarded). The remaining components for this embodiment are similar to those discussed above for FIG. 1 and will not be discussed in detail.

Some embodiments may use scaling chips only to convert the incoming image resolution and may still use the line capture method.

The desired resolution for exemplary video sources may be 1080P as this is typically the desired resolution for modern displays. However, this is not required, and systems can easily be adapted for 1080I, 720P, 720I, or any other resolutions, higher or lower than the ones listed here. All that is required is that the image sources are properly scaled when accepted by the system.

The embodiments described herein may work with the commercially available LCD displays from LG Electronics, Englewood Cliffs, N.J. An example would be model number M4714V. http://us.lge.com. These types of displays are also available from Manufacturing Resources International of Alpharetta, Ga. as the Triple View™ Displays. http://www.outdoor-displays.com/ These or similar displays contain the proper vertical line masking so that only certain pixel sets are viewable at discreet angles relative to the display. As described above, with reference to the vertical masking, the image shown to an observer varies as the observer travels horizontally in front of the display (such as when an observer walks on a horizontal surface past a mounted display). Other embodiments could use horizontal masking so that the image shown to the observer would change as the user travels vertically in front of the display (such as when an observer goes down a flight of stairs or escalator).

As discussed above, audio data may also be included with each of the video sources. With any of the embodiments discussed herein, the sound focusing techniques from co-pending application Ser. No. 12/248,255 filed on Oct. 9, 2008 may also be used. This application is herein incorporated by reference in its entirety. Thus, one type of audio data may be directed where the proper angle for viewing Source 1 would be. A second type of audio data may be directed where the proper angle for viewing Source 3 would be. A third type of audio data may be directed towards the center of the display where Source 2 may be visible. Matching different audio transmissions with the distinct video source may create an attention-capturing effect that will attract observers who may be passing by the display.

Figure 3:
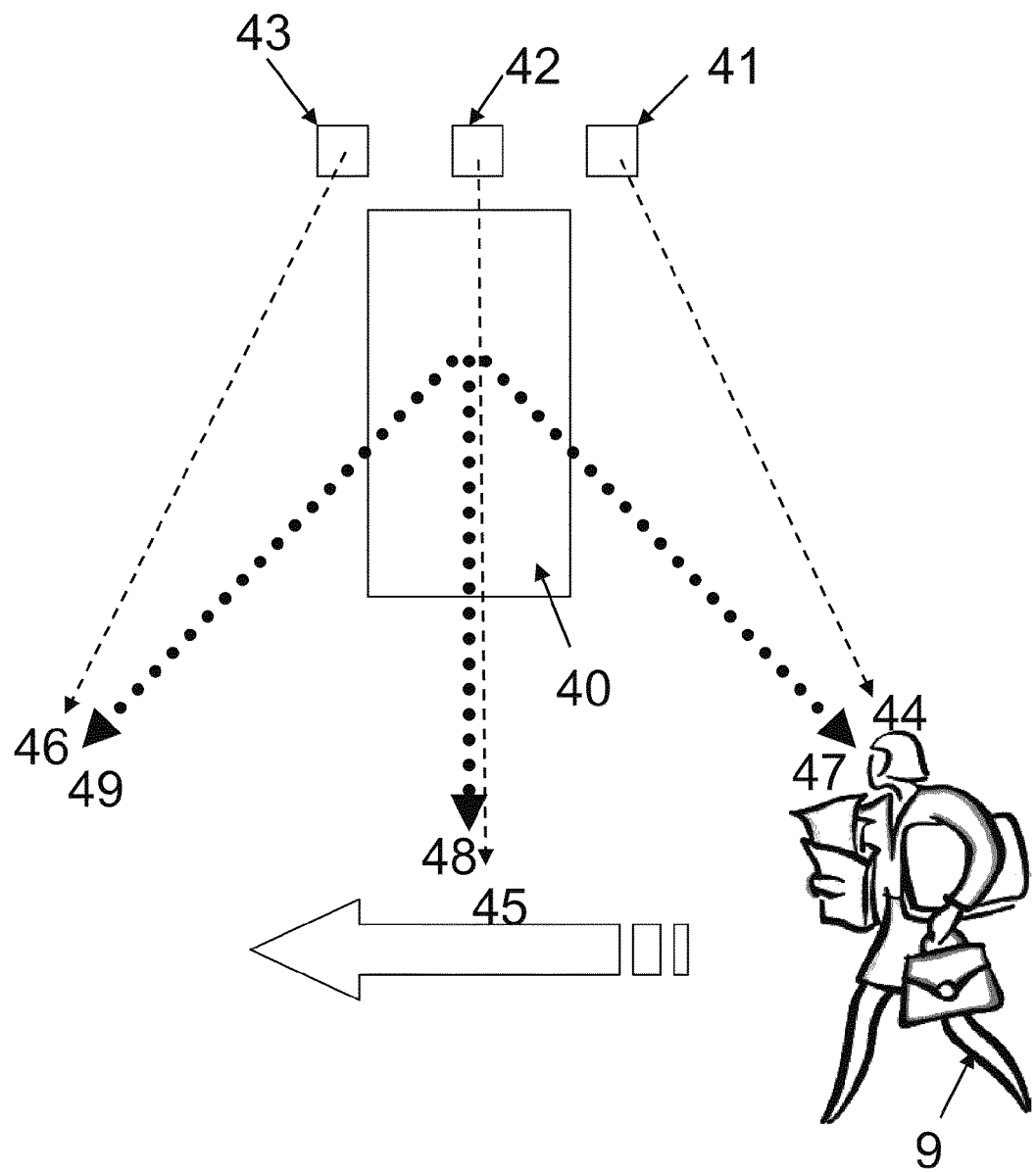
FIG. 3 shows an exemplary embodiment where a display is used to show three different images to three separate positions where three sound focusing devices also transmit separate audio streams to three positions.

FIG. 3 shows an exemplary embodiment where a display 40 is used to show three different images 47, 48, and 49 to three separate positions. This embodiment also contains three sound focusing devices 41, 42, and 43. Thus, as the consumer 9 passes the display 40, there may be a first image 47 viewable at the first position along with a first message 44. Accordingly, as the consumer 9 continues to travel, there may be a second image 48 viewable at a second position along with a second message 45. Finally, the consumer 9 may see a third image 49 at a third position along with a third message 46. By simply changing the masking on the display and using only two video sources, this embodiment could also show two images and transmit two messages rather than three separate images and three separate messages.

The sound focusing devices in the preferred embodiments may include a parametric audio amplifier system. These systems employ an acoustic transducer for projecting an ultrasonic carrier signal modulated with a processed audio signal through the air for subsequent regeneration of the audio signal along a selected path of projection. A conventional parametric audio amplifier system may include a modulator configured to modulate an ultrasonic carrier signal with a processed audio signal, a driver amplifier configured to amplify the modulated carrier signal, and at least one acoustic transducer configured to project a sonic beam corresponding to the modulated ultrasonic carrier signal through the air along a selected projection path. Because of the nonlinear propagation characteristics of the air, the projected sonic beam is demodulated as it passes through the air to regenerate the audio signal along the selected projection path. These systems are beneficial for focusing sound because the sound is transmitted in an ultrasound frequency (ie. above 20 k Hz) so that they are inaudible unless the listener is located near the desired position. Also, due to the high frequency of the carrier ultrasound wave, the direction of the wave and the desired position can be tightly controlled.

Exemplary parametric audio amplifier systems are commercially available from Holosonic Research Labs, Inc., of Watertown, Mass.; www.holosonics.com. Exemplary models may include the Audio Spotlight® line of products from Holosonic Research Labs. Further exemplary systems are available from American Technology Corporation (ATC), of San Diego, Calif.; www.atcsd.com. Exemplary models from ATC may include the SoundSaber® and the HyperSonic Sound® systems.

Alternatively, the sound focusing techniques in the preferred embodiments may include focused sound solutions from Dakota Audio, of Bismark, N. Dak.; www.dakotaadio.com. Exemplary models may include the MA-4, FA-603, FA-602, and FA-501. These models use an array of traditional, high-quality loudspeakers where the signals to the speakers may be delayed so that the sound waves propagate and develop in a specific position.

Also, the sound focusing techniques in the preferred embodiments may include focused sound solutions from Brown Innovations, Inc. of Chicago, Ill.; www.browninnovations.com. Exemplary models may include Maestro, Flush-Mount Maestro, MiniMaestro, and the SonicBeam™. These models also use an array of traditional, high-quality loudspeakers and may also utilize a sound dome.

Still further, the sound focusing elements may utilize the sound focusing techniques taught in U.S. Pat. No. 7,204,342 to Lee entitled "Sound Focus Speaker of Gas-Filled Sound Lens Attachment Type." This disclosure is herein incorporated by reference in its entirety.

Note that for projecting sound across large distances the parametric audio amplifier system may be preferred. Additionally, if two positions are relatively close to one another, or many positions are desired, the parametric audio amplifier system may be used for its ability to tightly control the sound projection.

Having shown and described a preferred embodiment of the invention, those skilled in the art will realize that many variations and modifications may be made to affect the described invention and still be within the scope of the claimed invention. Additionally, many of the elements indicated above may be altered or replaced by different elements which will provide the same result and fall within the spirit of the claimed invention. It is the intention, therefore, to limit the invention only as indicated by the scope of the claims.

The invention claimed is:

1. A system for displaying a plurality of video sources on a single display, the system comprising:
 a first, second, and third video system, each video system having:
  a video source supplying video data;
  a line capture processor in electrical communication with the video source which captures one out of every three vertical lines of video data;
  a buffer in electrical communication with the line capture processor;
 a transmitter in electrical communication with the first, second, and third video systems;
 a receiver in electrical communication with the transmitter;
 a frame buffer in electrical communication with the receiver; and
 a display in electrical communication with the frame buffer.

2. The system of claim 1 further comprising:
 a compression device in electrical communication with the buffer of each video system.

3. The system of claim 2 further comprising:
 a decompression device in electrical communication between the receiver and frame buffer.

4. The system of claim 1 wherein:
 the electrical communication between the transmitter and receiver is a wireless electrical connection.

5. The system of claim 1 wherein:
 the electrical communication between the transmitter and receiver is a CATV cable.

6. The system of claim 1 further comprising:
 a scaling chip in electrical communication with the video source of each video system.

7. The system of claim 1 further comprising:
 a sound focusing device at the display.

8. The system of claim 7 wherein:
 the sound focusing device is a parametric audio amplifier system.

9. The system of claim 1 further comprising:
 a first, second, and third sound focusing device at the display where the first sound focusing device is synced with the first video source, the second sound focusing device is synced with the second video source, and the third sound focusing device is synced with the third video source.

10. A system for displaying a plurality of video sources on a single display, the system comprising:
 a first and second video system, each video system having:
  a video source supplying video data which contains a plurality of vertical lines;
  a scaling chip in electrical communication with the video source which captures every other vertical line of video data;
  a buffer in electrical communication with the line capture processor;
 a transmitter in electrical communication with the first and second video systems;
 a receiver in electrical communication with the transmitter;
 a frame buffer in electrical communication with the receiver; and
 a display in electrical communication with the frame buffer which displays the captured lines of video data from the first and second video systems simultaneously.

11. The system of claim 10 further comprising:
 a compression device in electrical communication with the buffer of each video system.

12. The system of claim 11 further comprising:
 a decompression device in electrical communication between the receiver and frame buffer.

13. The system of claim 10 wherein:
 the electrical communication between the transmitter and receiver is a wireless electrical connection.

14. The system of claim 10 wherein:
 the electrical communication between the transmitter and receiver is a CATV cable.

15. The system of claim 10 further comprising:
 a sound focusing device at the display.

16. The system of claim 15 wherein:
 the sound focusing device is a parametric audio amplifier system.

17. A method for displaying multiple images on a single display, the method comprising the steps of:
 providing three video sources which produce video frames having a plurality of vertical lines;
 capturing one out of every three vertical lines of the video frames from each video source to produce partial video frames for each video source;
 transmitting the partial video frames to a display having a vertical line masking;
 assembling the partial video frames for each video source into a single video frame; and
 displaying the single video frame on the display such that the partial video frame of the first video source is viewable from a first angle to the display, the partial video frame of the second video source is viewable from a second angle to the display, and the partial video frame of the third video source is viewable from a third angle to the display.

18. The method of claim 17 further comprising the step of:
 compressing the partial video frames prior to transmitting them.

19. The method of claim 17 further comprising the step of:
 scaling the video frames prior to capturing one out of every three vertical lines.

20. The method of claim 17 further comprising the step of:
 storing the single video frame in a frame buffer prior to displaying the single video frame.

21. The method of claim 17 further comprising the step of:
 transmitting a first, second, and third audio packet to the display in addition to the partial video frames;
 broadcasting the first audio packet towards a first angle relative to the display;
 broadcasting the second audio packet towards a second angle relative to the display; and
 broadcasting the third audio packet towards a third angle relative to the display.

* * * * *